United States Patent
Froehlich et al.

(10) Patent No.: US 6,754,848 B1
(45) Date of Patent: Jun. 22, 2004

(54) METHOD, SYSTEM AND PROGRAM PRODUCTS FOR OPERATIONALLY MIGRATING A CLUSTER THROUGH EMULATION

(75) Inventors: Steven E. Froehlich, Danbury, CT (US); Michael K. Coffey, Shokan, NY (US); Paul D. Moyer, Catskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/408,916

(22) Filed: Sep. 30, 1999

(51) Int. Cl.[7] .............................................. G06F 11/00
(52) U.S. Cl. ........................ 714/28; 714/47; 717/168; 717/172; 717/176
(58) Field of Search .............................. 714/47, 38, 20, 714/6, 28; 713/100, 502; 711/162, 173; 707/203, 8, 511, 201; 717/134, 168, 176, 172; 709/203, 229; 347/7; 701/208; 340/990

(56) References Cited

U.S. PATENT DOCUMENTS

| | | | |
|---|---|---|---|
| 5,008,814 A | * | 4/1991 | Mathur ........................ 709/221 |
| 5,019,963 A | | 5/1991 | Alderson et al. |
| 5,155,837 A | * | 10/1992 | Liu et al. ..................... 709/221 |
| 5,155,847 A | * | 10/1992 | Kirouac et al. ............. 709/221 |
| 5,247,683 A | | 9/1993 | Holmes et al. |
| 5,359,730 A | | 10/1994 | Marron |
| 5,561,799 A | * | 10/1996 | Khalidi et al. ............... 707/200 |
| 5,577,232 A | * | 11/1996 | Priem et al. ................. 717/170 |
| 5,721,943 A | * | 2/1998 | Johnson ....................... 713/300 |
| 5,729,761 A | | 3/1998 | Murata et al. |
| 5,764,992 A | | 6/1998 | Kullick et al. |
| 5,799,189 A | | 8/1998 | Koser et al. |
| 5,832,275 A | | 11/1998 | Olds |
| 6,000,044 A | * | 12/1999 | Chrysos et al. ................ 714/47 |
| 6,012,059 A | * | 1/2000 | Neimat et al. .................. 707/8 |
| 6,131,148 A | * | 10/2000 | West et al. .................. 711/162 |
| 6,205,548 B1 | * | 3/2001 | Hasbun .......................... 713/2 |
| 6,237,091 B1 | * | 5/2001 | Firooz et al. .................. 713/1 |
| 6,347,396 B1 | * | 2/2002 | Gard et al. .................. 717/168 |
| 6,401,093 B1 | * | 6/2002 | Anand et al. ................. 707/10 |
| 6,411,966 B1 | * | 6/2002 | Kwan et al. ................. 707/201 |
| 6,418,524 B1 | * | 7/2002 | Van Dyke et al. .......... 711/208 |
| 6,453,383 B1 | * | 9/2002 | Stoddard et al. ............ 711/112 |
| 6,463,584 B1 | * | 10/2002 | Gard et al. .................. 717/171 |
| 6,681,390 B2 | * | 1/2004 | Fiske .......................... 717/173 |

FOREIGN PATENT DOCUMENTS

JP          05-324303          12/1993  ............. G06F/9/06

* cited by examiner

*Primary Examiner*—Robert Beausoliel
*Assistant Examiner*—Michael Maskulinski
(74) *Attorney, Agent, or Firm*—Lawrence D. Cutter, Esq.; Blanche E. Schiller, Esq.; Heslin Rothenberg Farley & Mesiti P.C.

(57) ABSTRACT

An updating capability updates a component of a computing environment, while maintaining the availability of the computing environment. In particular, a component of the computing environment which is associated with at least a portion of a unit of work is updated from one version to another version. Subsequently, the updated component emulates the original version, or operates in a compatibility mode, while other components of the computing environment, which are similarly associated with the same unit of work, remain at the original version.

6 Claims, 5 Drawing Sheets fig. 1 fig. 2 fig. 3A   TO FIG. 3B fig. 3B fig. 4A fig. 4B

METHOD, SYSTEM AND PROGRAM PRODUCTS FOR OPERATIONALLY MIGRATING A CLUSTER THROUGH EMULATION

CROSS-REFERENCE TO RELATED APPLICATIONS

This application contains subject matter which is related to the subject matter of the following application, which is assigned to the same assignee as this application and filed on the same day as this application. The below listed application is hereby incorporated herein by reference in its entirety:

"METHOD, SYSTEM AND PROGRAM PRODUCTS FOR OPERATIONALLY BACKING OUT COMPONENTS OF A CLUSTER THROUGH EMULATION" Froehlich et al., Ser. No. 09/408,915, filed herewith;

TECHNICAL FIELD

This invention relates, in general, to the updating or migration of components in a computing environment, and in particular, to updating a component and subsequently operating the updated component in a compatibility mode to maintain availability of the computing environment.

BACKGROUND ART

In a distributed computing environment, individual computing units or nodes are interconnected via a network to form a cluster. By connecting the nodes in this manner, the individual nodes may communicate with one another to accomplish a single task or process a unit of work distributed among the individual computing units. One way to accomplish such a task is to run multiple images of a single program or component on several of the individual nodes. By concurrently running the images on individual nodes, different portions of the unit of work may be jointly processed at the same time. Distributing the unit of work between multiple components in this manner allows the task or unit of work to be more effectively processed.

From time to time, the program being processed by the individual components is required to be updated from a current version to a newer version in order to enhance the functionality or to address problems associated with the current version of the program. One technique for performing these updates or migrations is to first shut down all of the nodes of the system. After all of the nodes have been deactivated, the current version of the component is updated on each of the nodes. Then, after all of the components have been migrated, the nodes are reactivated running the newer version of the program. However, since the entire system must be deactivated while the individual components are updated, this method is unacceptably disruptive with continuous availability or mission critical systems running twenty-four hours a day.

In the alternative, another technique allows components within the computing environment to be migrated or updated individually. In this technique, the selected component is deactivated, updated and later reactivated within the cluster without having to deactivate the entire cluster. However, with this technique, a user must consciously be aware of utilizing only the functionality supported by older version components. Thus, because a user must actively be aware of limitations of nodes running the older versions of the component, this method proves to be unduly burdensome to the users of the system.

Thus, a need exists for a capability that allows upgrading or migrating of individual components in a computing environment which does not require the entire cluster to be deactivated. Furthermore, a need exists for a capability which does not require a user to be consciously aware of the limitations of the older version components.

SUMMARY OF THE INVENTION

The shortcomings of the prior art are overcome and additional advantages are provided through the provision of a computing environment component updating capability. In one embodiment, a method of updating components in the computing environment includes updating a component of a computing environment which is associated with at least a portion of a unit of work from one version to another version; and emulating, by the updated component, the one version while at least one other component of said computing environment associated with said unit of work, remains at said one version.

In another aspect, a system for updating components in a computing environment is provided. The system includes means for updating a component of the computing environment which is associated with at least a portion of a unit of work from one version to another version; and means for emulating, by the updated component, said one version while at least one other component of a computing environment associated with the unit of work, remains at said one version.

In yet another aspect of the present invention, another system for updating components in a computing environment is provided. The system includes an updating device for updating a component of the computing environment which is associated with at least a portion of a unit of work from one version to another version; and an emulator for emulating, by the updated component, said one version while at least one other component of said computing environment associated with said unit of work, remains at said one version.

In yet another aspect of the present invention, an article of manufacture including at least one computer usable medium having computer readable program code means embodied therein for causing the updating of components in a computing environment is disclosed. The computer readable program code means in the article of manufacture includes, for instance, computer readable program code means for updating a component of the computing environment which is associated with at least a portion of a unit of work from one version to another version; and computer readable program code means for emulating, by the updated component, said one version while at least one other component of the computing environment associated with the unit of work, remains at said one version.

Thus, in accordance with one aspect of the invention, presented herein is an updating capability in which a component of a computing environment is updated while maintaining the availability of the computing environment. In particular, a component of the computing environment which is associated with a portion of a unit of work is updated from one version to another version. Subsequently, the updated component emulates the original version, or operates in a compatibility mode, while other components of the computing environment, which are similarly associated with the same unit of work, remain at the original version.

In a further aspect of the present invention, presented herein is a backing-out capability in which a component of a computing environment is backed-out to an older version while maintaining the availability of the computing environment. More specifically, a component may be backed-out from a newer version to either the cluster version or to an intermediate version. In the latter case, the backed-out component operates in a compatibility mode with the cluster version.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with one aspect of the present invention, an updating capability is provided in which a component of a computing environment is updated while maintaining the availability of the computing environment. In particular, a component of the computing environment, which is associated with at least a portion of a unit of work, is updated from one version to another version. Subsequently, the updated component emulates the original version, or operates in a compatibility mode, while other components of the computing environment, which are similarly associated with the same unit of work, remain at the original version. While emulating the original version or operating in this compatibility mode, the updated component processes at the level of the original version without calling upon the added functionality of the new version, thereby allowing the computing environment to continue processing without interruption. One example of a computing environment in which the present invention may be implemented and utilized is depicted in FIG. 1.

Figure 1:
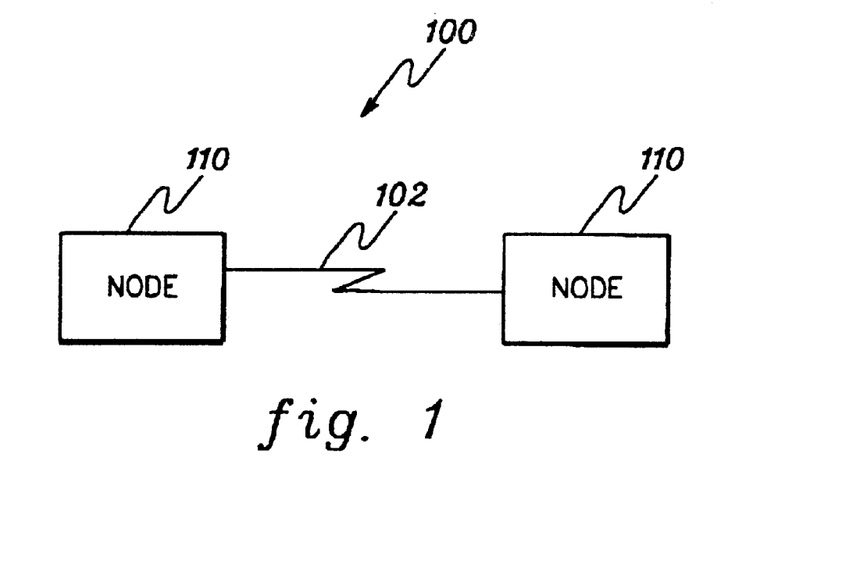
FIG. 1 depicts one example of a computing environment incorporating and using the updating capability of the present invention.

FIG. 1 depicts one example of a block diagram of a computing environment 100 incorporating the component updating capability of the present invention. In one embodiment, computing environment 100 includes at least two individual computing units or nodes 110, which may each be exemplified by an RS/6000 computing system offered by International Business Machines Corporation, Armonk, N.Y. The nodes 110, in turn, are interconnected via a network 102 which is, for instance, a local area network (LAN) or a wide area network (WAN).

In one embodiment, the interconnected nodes collectively form a cluster and are arranged in a manner such that they are capable of working together to process or accomplish a single task or unit of work. In particular, an image of a single component (e.g., a program) is implemented on each of the individual nodes of the computing environment. The unit of work, then, is distributed among the individual components of the computing environment for processing. In this manner, multiple images of the component, with each node running one image of the component, may concurrently process the unit of work. Thus, each image processes a particular portion of the unit of work so as to accomplish the task in a manner more effectively than with a single component. One example of such a component is the High Availability Cluster Multi-Processing (HACMP) product, which runs on an AIX operating system, both of which are offered by International Business Machines Corporation, Armonk, N.Y.

During the course of operation, as noted above, it often becomes necessary to update a current component version in order to, for example, implement enhanced functionality provided by a newer component version. In accordance with the principles of the present invention, this updating generally involves updating one component of the computing environment to a newer component version, and emulating the older component with the updated component version until the remaining components are updated. As described in greater detail below with reference to FIG. 2, this updating and subsequent emulation by the updated component is effected through use of information stored in a control structure located in either the individual nodes executing the components (e.g., in local memory) or in a database accessible by each of the components.

Figure 2:
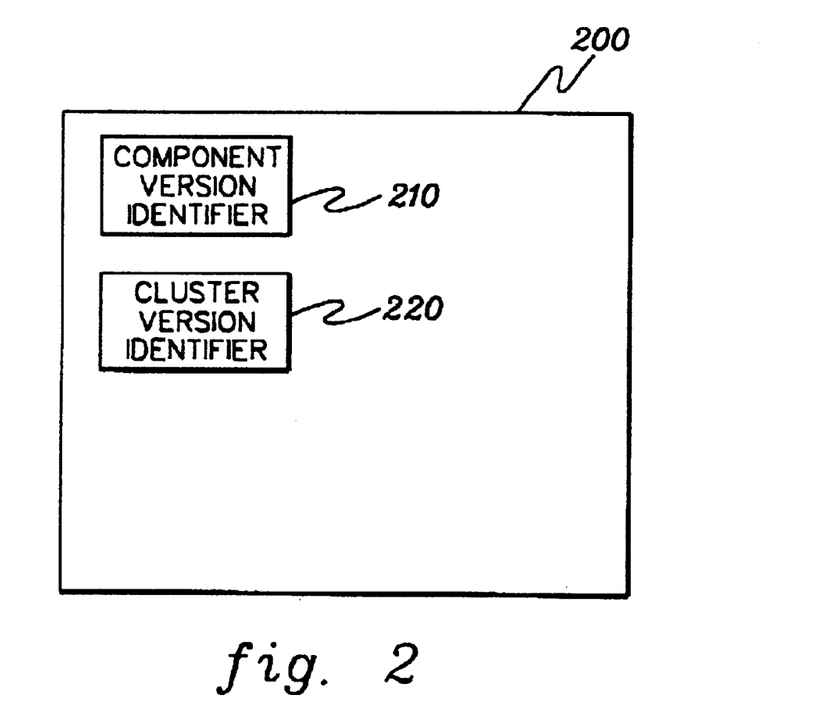
FIG. 2 depicts one example of a control structure including a component version identifier and a cluster version identifier, in accordance with the principles of the present invention.

One example of such a control structure implemented, for instance, in each node is depicted in FIG. 2. In accordance with the principles of the present invention, a control structure 200 includes a number of data fields which are used in determining the operating mode of the individual components. In this regard, field 210 represents a data field which contains a component version identifier corresponding to the version of its particular component. The component version identifier identifies the currently running version of the component and is updated with each update of the particular component. Thus, if a component was running at, for instance, version Y, the data field represented by field 210 would contain a version Y identifier. Likewise, if the component was updated to, for instance, version L, the data field represented by field 210, would similarly be updated to a version L identifier. (In one example, each updatable component of the computing environment has a component identifier associated therewith.)

In addition to containing the component version identifier of the node in which it is implemented, each control structure may also include the component version identifier of each node in the cluster. In this case, the control structure of each node would then be updated with each change in the cluster so that each control structure would typically, at any given time, contain the same information.

Field 220, on the other hand, represents a data field which contains a cluster version identifier of the computing environment. In contrast to the component version identifier described above, the cluster version identifier identifies for each updatable component (as one example) the lowest running version of that component in the computing environment. Thus, referring to FIG. 1, if nodes 110a and 110b were initially both running a component at version Y, and the component of node 110b was subsequently updated to version L, nodes 110a and 110b would have component version identifiers for that component of Y and L, respectively, and both would have a cluster version identifier for that component of Y.

In one example, control structure 200 includes a component version identifier and cluster version identifier for each updatable component associated with a particular node. In a further embodiment, there are one or more control structures associated with each updatable component.

Furthermore, although the control structure of FIG. 2 is described as being implemented in each of the nodes executing the individual components of the computing environment, the information contained in each control structure may just as easily be implemented in one or more databases accessible by each of the components. In this alternate embodiment, one or more control structures would be implemented containing a cluster version identifier, as well as component version identifiers corresponding to at least one of the components of the computing environment. This database could, for example, be located in a direct access storage device (DASD) or some other similar device. In any event, these identifiers, whether stored in the nodes executing the individual components or in a database accessible by each of the components in the computing environment, are utilized in determining the operational mode of the components as described in detail below with reference to FIGS. 3a–3b.

Figure 3A:
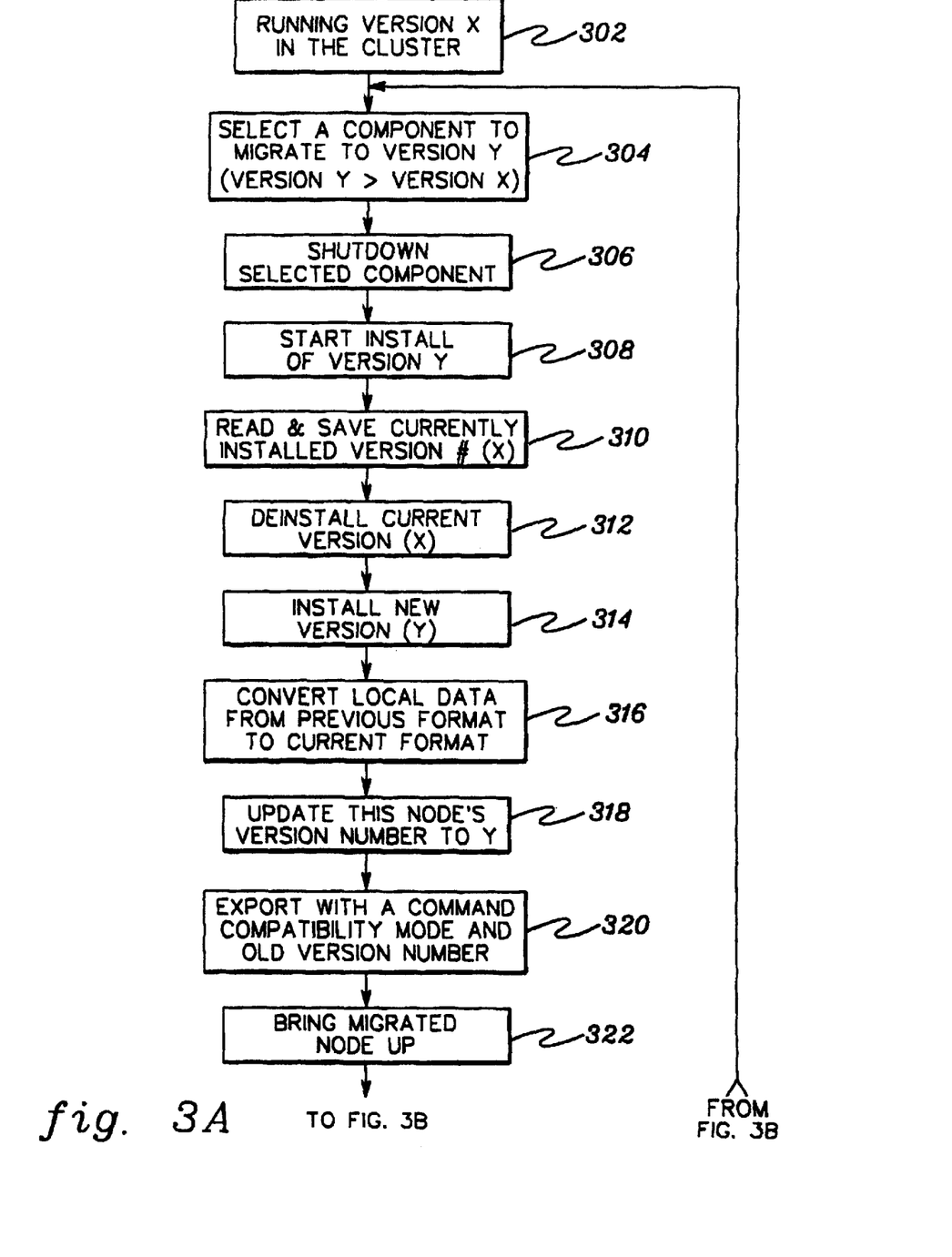
FIGS. 3a–3b depict one example of the logic associated with updating a component of a computing environment, in accordance with the principles of the present invention.
Figure 3B:
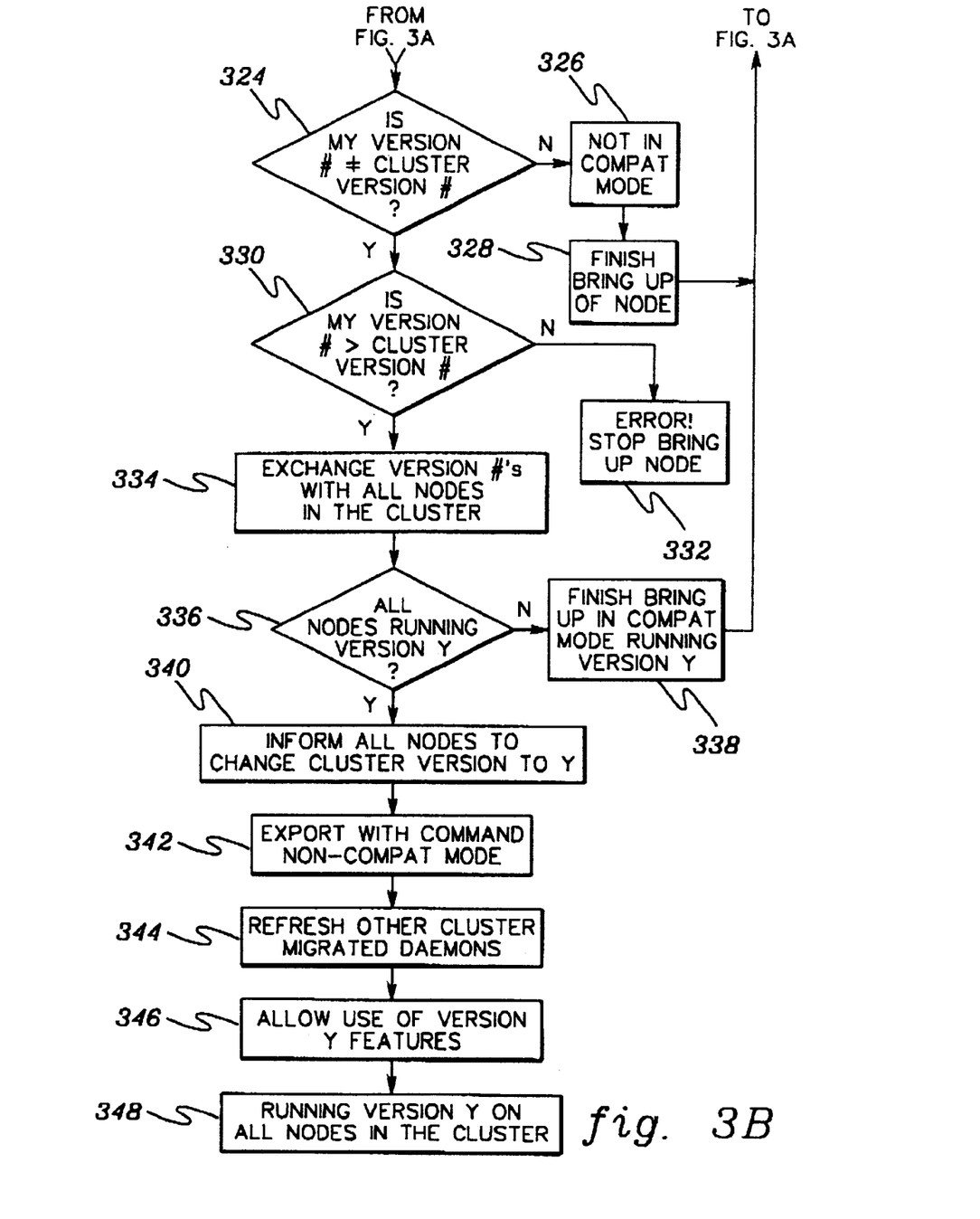

FIGS. 3a–3b depict one example of the logic used to update a component in a computing environment according to the principles of the present invention. Initially, version X of a component is running on a plurality of the nodes of the computing environment, STEP 302. At some point during the course of operation, a decision is made to update, or migrate, one component to version Y, STEP 304. This decision may be made by a user or some other similar determination made by the system. This particular node is then shutdown or deactivated (or in another embodiment, only the component is deactivated), STEP 306, and installation of version Y is commenced, STEP 308.

As part of the installation process commenced at STEP 308, the currently installed component version identifier is read and saved by the selected component, STEP 310. Thus, in this example, an identifier identifying version X corresponding to the currently running version of the selected component is read from local memory or a database and saved (again to either local memory or to a database) by the selected component for further use, if necessary. Subsequently, component version X is de-installed or deactivated from its node, STEP 312. After version X has been deactivated, the installation of component version Y continues, STEP 314.

Thus, local data of the component is converted from its previous format to a format which corresponds to version Y, STEP 316, and the updated component's version identifier is updated to reflect the change, STEP 318. Hence, at this time and in the instant example, an identifier identifying version Y is saved.

After saving the updated version identifier, the newly updated component exports a command to the other components in the computing environment, STEP 320. In one example, this command includes the old version number. Upon receiving the command, the receiving components execute the command which, in turn, causes the components to compare the updated component's version identifier with the cluster version identifier. At this point in the updating process, the comparison indicates that the updated component is operating in a compatibility mode. Shortly thereafter, activation of the updated node (or component) is commenced, STEP 322.

Once the updated node (or component) has been activated, the updated component checks its version identifier against the cluster version identifier, INQUIRY 324 (FIG. 3b). If the comparison reveals that the updated component's version identifier is equal to the cluster version identifier, then the updated component is not operating in a compatibility mode, STEP 326, and activation of the updated node (or component) is completed, STEP 328. From there, processing returns to STEP 304 where the migration of the computing environment continues with the selection of a component to be updated.

If the comparison of INQUIRY 324 reveals that the updated component's version identifier is not equal to the cluster version identifier, the updated component then determines whether its component version identifier is greater than the cluster version identifier, INQUIRY 330. If the comparison at INQUIRY 330 indicates that the updated component's identifier is not greater than the cluster version identifier, an error has occurred, STEP 332, and updating terminates. At this point, an error message is generated and steps may be taken to determine the cause of the error.

On the other hand, if the comparison at INQUIRY 330 indicates that the updated component's identifier is greater than the cluster version identifier, in embodiments not utilizing a control structure located in a database accessible by all of the components, the current version identifier is updated in the control structures in local memory of the nodes executing each of the components of the computing environment to reflect such a change, STEP 334. With embodiments utilizing a single control structure, there is no need to update a control structure to reflect such change because the current version identifier corresponding to the updated component was previously updated in STEP 318.

At INQUIRY 336, a check is made to determine whether each component of the computing environment is running at the same version. This check could be made by examining the control structure of the node at hand, if the component version identifiers of all of the nodes are contained therein, or of a control structure implemented in a data base accessible by one or more of the nodes. Furthermore, it is also possible for the node to perform the check simply by communicating with each of the other nodes in the cluster. In any event, if the check indicates that all of the nodes are not running at the same version, then the updated component continues its activation and commences operation in a compatibility mode emulating its original version, STEP 338. Processing then returns to STEP 304 where the migration of the computing environment continues with the selection of a component to be updated.

If the check at INQUIRY 336 reveals that all of the components are running at the same version, the cluster version identifier is updated to the newer version, STEP 340 (e.g., to version Y in this example). From there, the newly updated component exports a command to the other components in the computing environment, STEP 342. Upon receiving the command, the receiving components execute the command which causes the components to compare the updated component's version identifier with the cluster version identifier, STEP 344. At this point, since the cluster version identifier is equal to each of the component version identifiers, the comparison indicates that the components are no longer to operate in compatibility mode. Subsequently, each of the components allows the use of the added functionality offered by the newly installed version, STEP 346. Thereafter, the updating process ends with all components in the computing environment running at the newer version (i.e., version Y), STEP 348.

Although the embodiments described above are illustrated as updating each component to a newer version and then migrating the entire cluster, it is also possible, within the principles of the present invention, to update a component several times before migrating the cluster. Thus, as an example, referring again to FIG. 1, it is altogether possible to update a component from a cluster version of, for instance X, to a newer version of, for instance Y, and then to update the component again to yet another newer version of, for instance Z, all before the cluster has been migrated out of version X.

Figure 4A:
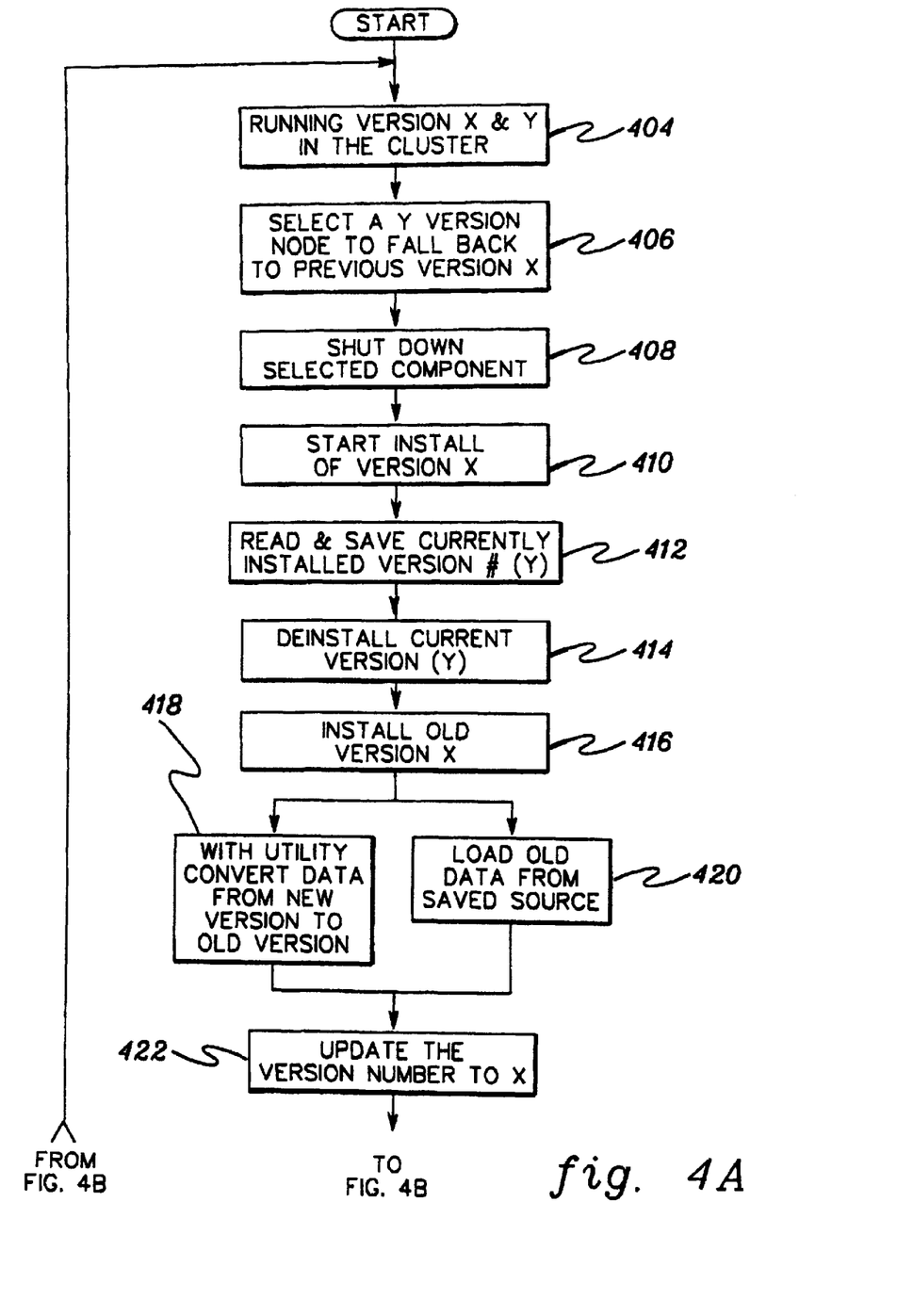
FIGS. 4a–4b depict one example of the logic associated with backing a component out of a version before a computing environment is fully updated, in accordance with the principles of the present invention.
Figure 4B:
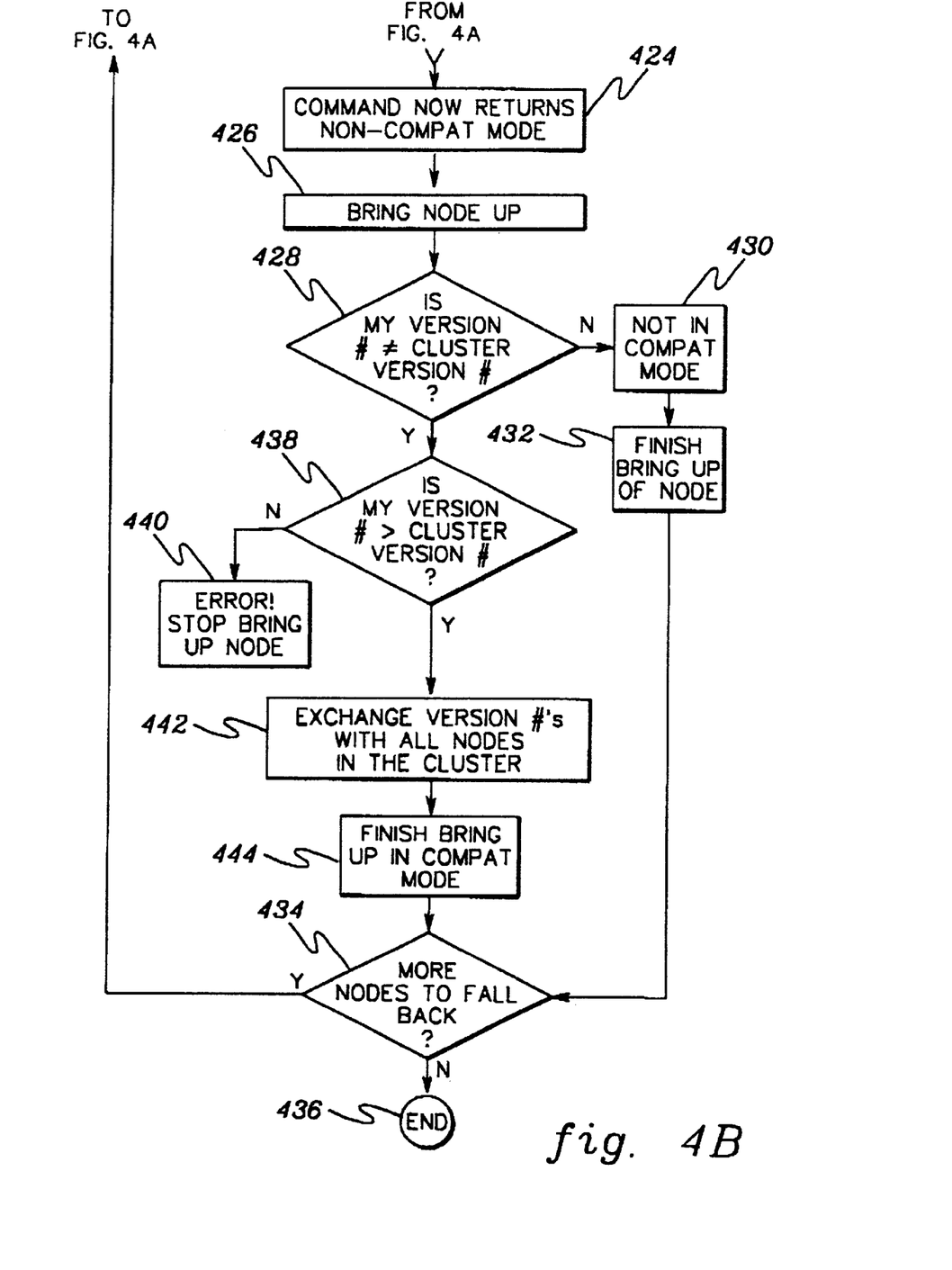

FIGS. 4a–4b depict another capability of the present invention. In particular, FIGS. 4a–4b illustrate, in accordance with one aspect of the present invention, one example of the logic used in backing a component out of a version before the computing environment is fully updated. More specifically, before a computing environment has fully migrated (i.e., before each of the components has been updated from the cluster version), individual components may be backed-out or returned from a newer version to a lower or original version. For instance, an individual component may be backed-out from a version newer than the cluster version directly to the cluster version, or in the alternative if intermediate versions exist, to such intermediate version. In the latter case, the backed-out component would then be operated in a compatibility mode with the cluster version, as discussed in detail below with reference to FIGS. 4a–4b.

Initially, referring to FIG. 4a, in STEP 404 the computing environment is depicted as operating in a mixed-state mode, or in other words, with one or more components processing at one version and one or more other components processing at another version. The backing out process then proceeds with the selection of one component, currently operating at a newer version, for example version Y, to fall back to a lower version, for example version X, STEP 406. This selection may be made by a user or some other similar determination made by the system. Subsequently, the selected node (or component) is shut down or deactivated, STEP 408. This is followed by the commencement of installation of the original version X on the selected node, STEP 410.

As part of the installation process of STEP 410, the currently installed component version Y is read and saved by the selected component, STEP 412. As discussed above, the identifier may be saved in either local memory of the nodes executing the individual components or in a database accessible by each of the components. Subsequently, the newer component version Y is de-installed or deactivated, STEP 414. After the newer version has been deactivated, the original component version X is installed, STEP 416.

Subsequent to the installation of version X, local data of the component is converted with a utility process from a format which corresponds to version Y to a format which corresponds to version X, STEP 418. In the alternative, instead of converting the local data as depicted in STEP 418, the local data may also be loaded from a source containing previously saved data corresponding to version X, STEP 420. In any event, after either of STEPS 418 or 420, the backed-out component's version identifier is updated to reflect the change, STEP 422. Hence, at this time, an identifier specifying version X is saved.

From there, the backed-out component exports a command to the other components in the computing environment, STEP 424 (FIG. 4b). Upon receiving the command, the receiving components execute the command which in turn causes the components to compare the backed-out component's version identifier against the cluster version identifier. At this point, since the cluster version identifier is not equal to each of the component version identifiers, the comparison indicates that the components are not in compatibility mode. Thereafter, the backed-out component is reactivated or brought back up, STEP 426.

Once the backed-out component has been reactivated, the backed-out component checks its version identifier against the cluster version identifier, INQUIRY 428. If the comparison reveals that the.backed-out component's version identifier is equal to the cluster version identifier, then the updated component is not operating in a compatibility mode, STEP 430, and reactivation of the updated node (or component) is completed at STEP 432.

From there, a determination is made as to whether any additional components are to be backed-out to the original component version, INQUIRY 434. If the result of the determination indicates that no other components are to be backed-out to the original component version, the backing-out process ends, STEP 436. If the result of the determination of INQUIRY 434 reveals that additional components are to be backed-out, processing returns to STEP 404 where the backing-out procedure continues with the selection of another component to be backed-out.

Returning now to INQUIRY 428, if the comparison reveals that the backed-out component's version identifier is not equal to the cluster version identifier, thus indicating that the backed-out component has been backed-out into a version newer than the cluster version, the backed-out component determines whether its component version identifier is greater than the cluster version identifier, INQUIRY 438. If the comparison indicates that the backed-out component's identifier is not greater than the cluster version identifier, an error has occurred, STEP 440, and backing-out terminates. At this point, an error message is generated and steps may be taken to determine the cause of the error.

On the other hand, if the comparison at INQUIRY 438 indicates that the backed-out component's identifier is greater than the cluster version identifier, in embodiments not utilizing a control structure located in a database accessible by all of the components, the current version identifier is updated in the control structures in local memory of the nodes executing the components of the computing environment to reflect such change, STEP 442. With embodiments utilizing a single control structure, there is no need to update a control structure to reflect such a change because the current version identifier corresponding to the backed-out component was previously updated in STEP 422.

Next, since the component at hand has been backed-out into an intermediate version, and since all of the components are not running at a version newer than the cluster version (see, STEP 430), backing-out continues with activation and commencement of operation in a compatibility mode emulating the original version, STEP 444. Processing then continues with INQUIRY 434 where the procedure determines whether any additional components are to be backed-out to the original component version.

Thus, in accordance with one aspect of the invention, presented herein is an updating capability in which a component of a computing environment is updated while maintaining the availability of the computing environment. In particular, a component of the computing environment which is associated with a portion of a unit of work is updated from one version to another version. Subsequently, the updated component emulates the original version, or operates in a compatibility mode, while other components of the computing environment, which are similarly associated with the same unit of work, remain at the original version.

A further aspect of the present invention, includes a backing-out capability in which a component of a computing environment is backed-out to an older version while maintaining the availability of the computing environment. More specifically, a component may be backed-out from a newer version to either the cluster version or to an intermediate version. In the latter case, the backed-out component operates in a compatibility mode with the cluster version.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of updating components in a computing environment, said method comprising:
   updating a component of said computing environment which is associated with at least a portion of a unit of work from one version to another version;
   emulating, by said updated component, said one version, while at least one other component of said computing environment associated with said unit of work remains at said one version;
   utilizing a cluster version identifier to represent a lowest running version of said distributed computing environment; and
   emulating, by said updated component, said lowest running version when any one of said component and said at least one other component have not been updated to said one version.

2. The method of claim 1, further comprising updating said cluster version identifier, to correspond to said one version, when said component and said at least one other component have been updated to said one version.

3. A system for updating components in a computing environment, said system comprising:
   means for updating a component of said computing environment which is associated with at least a portion of a unit of work from one version to another version;
   means for emulating, by said updated component, said one version, while at least one other component of said computing environment associated with said unit of work remains at said one version;
   means for utilizing a cluster version identifier to represent a lowest running version of said distributed computing environment; and
   means for emulating, by said updated component, said lowest running version when any one of said component and said at least one other component have not been updated to said one version.

4. The system of claim 3, further comprising means for updating said cluster version identifier, to correspond to said one version, when said component and said at least one other component have been updated to said one version.

5. An article of manufacture, comprising:
   at least one computer usable medium having computer readable program code means embodied therein for causing the updating of components in a computing environment, the computer readable program code means in said article of manufacture comprising:
      computer readable program code means for updating a component of said computing environment which is associated with at least a portion of a unit of work from one version to another version;
      computer readable program code means for emulating, by said updated component, said one version, while at least one other component of said computing environment associated with said unit of work remains at said one version;
      computer readable program code means for utilizing a cluster version identifier to represent a lowest running version of said distributed computing environment; and
      computer readable program code means for emulating, by said updated component, said lowest running version when any one of said component and said at least one other component have not been updated to said one version.

6. The article of manufacture of claim 5, further comprising computer readable program code means for updating said cluster version identifier, to correspond to said one version, when said component and said at least one other component have been updated to said one version.

* * * * *